(12) United States Patent
vor dem Esche et al.

(10) Patent No.: US 10,224,720 B2
(45) Date of Patent: Mar. 5, 2019

(54) COMBINED POWER PLANT (71) Applicant: ENRICHMENT TECHNOLOGY COMPANY LTD. ZWEIGNIEDERLASSUNG DEUTSCHLAND, Jülich (DE)

(72) Inventors: Rainer vor dem Esche, Heinsberg (DE); Christoph Treppmann, Aachen (DE)

(73) Assignee: ENRICHMENT TECHNOLOGY COMPANY LTD. ZWEIGNIEDERLASSUNG DEUTSCHLAND (DE)

( * ) Notice: Subject to any disclaimer, the term of this patent is extended or adjusted under 35 U.S.C. 154(b) by 410 days.

(21) Appl. No.: 14/897,793

(22) PCT Filed: Jun. 20, 2014

(86) PCT No.: PCT/EP2014/063066
§ 371 (c)(1),
(2) Date: Dec. 11, 2015

(87) PCT Pub. No.: WO2014/206894
PCT Pub. Date: Dec. 31, 2014

(65) Prior Publication Data
US 2016/0118801 A1    Apr. 28, 2016

(30) Foreign Application Priority Data
Jun. 27, 2013   (EP) ..................................... 13173934

(51) Int. Cl.
*H02J 3/40* (2006.01)
*F01K 13/02* (2006.01)
(Continued)

(52) U.S. Cl.
CPC .............. *H02J 3/40* (2013.01); *F01D 21/003* (2013.01); *F01K 13/02* (2013.01); *G05B 15/02* (2013.01); *H02J 1/16* (2013.01); *H02J 3/30* (2013.01)

(58) Field of Classification Search
CPC .... H02J 3/40; H02J 3/30; G05B 15/02; F01D 21/003; F01K 13/02
See application file for complete search history.

(56) References Cited

U.S. PATENT DOCUMENTS

| | | | | |
|---|---|---|---|---|
| 2005/0077881 A1* | 4/2005 | Capp | .......................... | H02J 3/30 322/29 |
| 2007/0000230 A1* | 1/2007 | Jones | ....................... | G05B 9/02 60/39.281 |
| 2007/0266423 A1* | 11/2007 | Tehee, Jr. | ................ | F03D 7/028 726/3 |

FOREIGN PATENT DOCUMENTS

| | | | | |
|---|---|---|---|---|
| FR | 2 976 136 A1 | 12/2012 | | |
| FR | 2976136 A1 | * 12/2012 | ............. | F01K 13/02 |
| WO | WO 2005/029667 A2 | 3/2005 | | |

OTHER PUBLICATIONS

International Search Report for Application No. PCT/EP2014/063066 dated May 7, 2015.

* cited by examiner

*Primary Examiner* — Kenneth M Lo
*Assistant Examiner* — David J Wynne
(74) *Attorney, Agent, or Firm* — Tarolli, Sundheim, Covell & Tummino LLP (57) ABSTRACT A combined power plant is disclosed for feeding energy into a non-local power network. The combined power plant includes at least one turbine power plant and at least one energy storage installation with one or more energy storage modules, whereby the turbine power plant is connected to (Continued)

the non-local power network in order to feed in power. A monitoring unit monitors the rotational speed of a turbine on the basis of a rotational speed-specific characteristic quantity, at least while the energy is being fed into the non-local power network. The energy storage installation is connected to the non-local power network separately or via the turbine power plant, whereby the monitoring unit is connected to a control unit of the appertaining energy storage installation in order to transmit a characteristic quantity signal based on the rotational speed-specific characteristic quantity to the control unit via a data connection.

16 Claims, 5 Drawing Sheets

(51) Int. Cl.
*H02J 3/30* (2006.01)
*F01D 21/00* (2006.01)
*G05B 15/02* (2006.01)
*H02J 1/16* (2006.01)

COMBINED POWER PLANT

FIELD OF THE INVENTION

The invention relates to a combined power plant comprising at least one turbine power plant and at least one energy storage installation, and it also relates to an appertaining method for operating such a combined power plant.

BACKGROUND OF THE INVENTION

The energy needed to operate a power network is supplied by several different types of power plants such as, for example, nuclear power plants, coal-burning power plants, natural-gas power plants, wind power plants, biogas power plants, or solar power plants, all of which feed energy into a non-local power network. Non-local power networks are, for instance, transmission networks such as those operated in Germany, for example, by Amprion, 50 Hertz, Tennet and TransnetEnBW. These transmission networks are part of the European interconnection grid. Up until now, a network frequency of 50 Hz has been used in these networks in order to stabilize the network. Within the scope of the expansion of renewable energies, there is an ever-greater trend towards reducing the number of turbine power plants (referring here to power plants with turbines for generating energy and feeding it into the grid). As a result, correspondingly fewer turbines of turbine power plants will feed power into the network and will thus have correspondingly less influence on the network frequency. When the load in the network increases, the turbine shafts of turbine power plants are decelerated in order to release energy, so that normally, the network frequency decreases. Conversely, when the load decreases, the rotational speeds of the turbines rise and thus, as a rule, the network frequency also increases. However, when it is mostly network inverters that provide the power during the power production using renewable energies such as, for instance, wind power plants, biogas power plants, or solar power plants, then the amount of power no longer influences the network frequency, so that switching the turbine power plants on and off can no longer be regulated on the basis of an increase or decrease in the network frequency. In this case, the network no longer responds to a change in the load state by changing the network frequency, but rather, the network inverters are switched off abruptly in case of an overload, which could lead to a global blackout (power failure in major power grids).

Before this backdrop, it would be desirable to have a power network that is sufficiently safeguarded against a power failure (blackout), even in case of a reduced number of turbine power plants.

SUMMARY OF THE INVENTION

It is an objective of the present invention to put forward a suitable power plant and an appertaining method for feeding energy into a non-local power network by means of which the safety against a sudden power failure (blackout) in the non-local network can be improved.

This objective is achieved by a combined power plant for feeding energy into a non-local power network, comprising at least one turbine power plant and at least one energy storage installation with one or more energy storage modules, whereby the turbine power plant is connected to the non-local power network in order to feed in power, and comprising a monitoring unit that monitors the rotational speed of the turbine on the basis of a rotational speed-specific characteristic quantity, at least while the energy is being fed into the non-local power network, whereby the energy storage installation is connected to the non-local power network separately or via the turbine power plant, whereby the monitoring unit is connected to a control unit of the appertaining energy storage installation in order to transmit a characteristic quantity signal based on the rotational speed-specific characteristic quantity to the control unit via a data connection, and the control unit of the energy storage installation is configured in such a way that—in response to the characteristic quantity signal—it causes the energy storage installation to feed additional energy into the non-local power network, if the rotational speed of the turbines is falling.

By augmenting the turbine power plant with an energy storage system that is also connected to the turbine power plant in such a way that the energy storage system releases energy into the non-local power network if the rotational speed of the turbine falls, the drop in the rotational speed of the turbine is reduced more slowly as a result of an external load in the non-local power network than is the case without an added-on energy storage installation. Depending on the amount of additionally fed-in energy, the rotational speed of the turbine can also be raised again to the target value. In this manner, the total inertia of the combined power plant as a total system is increased and consequently, it behaves towards the outside as if the rotating mass (turbine) had been augmented. Thus, without an actual additional mass, the stabilizing effect of the remaining turbines can be improved, without having to use the control parameters of a network frequency for this purpose. Consequently, this combined power plant can be used with the same stabilizing effect, even in the absence of a frequency regulation of the turbine power plant, thanks to the network frequency of the non-local power network, thereby improving the safety against so-called blackouts in non-local power networks that have a large number of power plants based on regenerative energy sources that feed their energy into the non-local power network via network inverters at a constant network frequency, so that the previously common regulation of the turbine power plants on the basis of the fluctuation of the network frequency would be impossible or at least so laborious that, without the use of the solution according to the invention, the risk of a blackout would rise. Moreover, owing to the combined power plants according to the invention, it is possible to dispense with the need to retool the system with so-called virtual synchronous machines in the case of power plants having network inverters. Without the combined power plant according to the invention, the power plants having network inverters, especially the power plants that generate energy on the basis of regenerative energies such as wind power plants or solar power plants, would have to be equipped with such virtual synchronous machines so that these power plants could be smoothly integrated into the network in order to continue to allow a global control of all of the turbine power plants on the basis of the network frequency determined in the network. Thus, the combined power plant according to the invention also results in a more favorable use of power plants that are connected to the non-local power network via network inverters, without so-called virtual synchronous machines. Furthermore, energy storage systems that are connected to the non-local power network likewise do not need virtual synchronous machines for the network connection.

Therefore, with the present invention, the supply reliability and network quality in a non-local power network or interconnection grid are ensured. Precisely the possibility of positive and negative energy provision (feeding energy into and absorbing energy from the power network) permits a flexible response to the existing power network states that are ascertained indirectly via the rotational speed of the turbines of the turbine power plant. By means of the energy storage installation(s), the needs of non-local power networks can be efficiently met by the interaction between the turbine power plant and the energy storage installation. Owing to the energy storage system according to the invention, an improvement in the technical and financial usability of regenerative energy sources can also be achieved and the regulation in the non-local power network can be simplified.

Here, the expression "non-local power network" refers to a power network (below also referred to simply as network) that extends transregionally over very large areas. Transmission networks (public power grid) are examples of non-local power networks. The public power grid in Germany consists, for example, of four transmission networks that are operated by the network operators Amprion, 50 Hertz, Tennet and TransnetEnBW. These four transmission networks together form the interconnection grid for Germany. In other countries, corresponding transmission networks are operated by other network operators. The superordinated European interconnection grid consisting of the appertaining transmission networks in the individual countries should likewise be seen as a non-local power network, for which, however, only the standards for the operating reserve have been stipulated at the present time.

The expression "turbine power plant" refers to power plants with turbines. Such power plants are suitable, for example, for feeding the operating reserve (also referred to as reserve power or reserve capacity) into a power network in order to supply power customers with precisely the required electric power. For this purpose, short-term power adaptations can be carried out in turbine power plants in that fast-starting power plants (e.g. gas turbine power plants) are started up or in that pumped storage power plants are used. The operating reserve is a part of the transient power that is needed within the scope of the provision of energy in order to cover losses and in order to compensate for differences between the power that is fed in and the power that is absorbed. The regulatable power plants serve to provide a primary and a secondary operating reserve in the non-local power network. The primary operating reserve serves to compensate for imbalances between the physical power supply and the power demand with the objective of restoring a stable network frequency. The secondary operating reserve is intended to restore the balance between the physical power supply and the power demand after the occurrence of a difference, whereby, in contrast to the primary regulation, only the situation in the specific regulation zone—including the power exchange with other regulations zones—is taken into consideration. The expression "turbine power plants" as set forth in the present invention refers, for example, to coal-burning power plants, gas turbine power plants, nuclear power plants or pumped storage power plants. All of these power plants are connected to the power network via turbines.

The expression "turbine" refers here to a power-generating turbo machine that converts the internal energy of a flowing medium (liquid or gas) into rotational energy and ultimately—via a generator—into electric energy. Whereas hot-steam turbines operating at 3000 rpm or 3600 rpm are normally used in large conventional power plants (for example, coal-burning or gas power plants), nuclear power plants usually utilize saturated-steam turbines operating at 1500 rpm or 1800 rpm. It is here that the highest power plant outputs are achieved, often more than 1000 MW. The turbine power plants (with one or more separate power plant blocks) can comprise one or more separate turbines for generating power and feeding it into the non-local power network. When the load in the network increases, the turbine shafts of the turbines of regulatable power plants are decelerated (the rotational speed of the turbines decreases) in order to release energy. Conversely, the rotational speeds of the turbines rise when the load decreases.

The expression "monitoring unit" refers to any unit that is capable of monitoring the rotational speed of the turbine on the basis of a rotational speed-specific characteristic quantity. The expression "rotational speed-specific characteristic quantity" refers to the physical quantity that either indicates the rotational speed directly or else that can be determined indirectly from the rotational speed. Such rotational speed-specific characteristic quantities are, for example, the turbine rotational speed itself, the turbine frequency, or else the network frequency at the outlet of the turbine. Through the correlation between the rotational speed and the rotational speed-specific characteristic quantity, the change in the rotational speed-specific characteristic quantity represents a rise or a fall in the rotational speed, depending on the selected characteristic quantity. Within the scope of the present invention, the person skilled in the art can also select other suitable rotational speed-specific characteristic quantities. The monitoring unit can be, for example, a device comprising the measuring units that serve to determine the rotational speed-specific characteristic quantity as well as a processor and, if applicable, additional components for evaluating, recording and transmitting the rotational speed-specific characteristic quantity. In another embodiment, the monitoring unit can also be connected to one or more such measuring units. The processor can calculate a rotational speed, for example, from the rotational speed-specific characteristic quantity in that an appropriate algorithm is executed in the processor. This rotational speed can be compared in the processor to a target rotational speed, thereby ascertaining a rise or a fall in the rotational speed of the turbine. As an alternative, the rotational speed-specific characteristic quantity can be compared to a target value that represents the target rotational speed. The rise or fall in the rotational speed of the turbine is then ascertained on the basis of the deviation of the rotational speed-specific characteristic quantity from a target value.

A fall in the rotational speed of the turbine (for instance, below a first threshold value) indicates a high load in the connected power network that can hardly or not at all be accommodated by the power plants (turbine power plants and all other power plants such as wind power plants and solar power plants) that are feeding energy into the non-local power network at that moment. The continuation of this imbalance could lead to a global network failure (blackout). In the case of a large number of power plants (for example, wind power plants or solar power plants) that are feeding their energy into the non-local power network via a network inverter, the network frequency itself would not be measurable with sufficient precision because of the masking of this parameter by the network inverters that are feeding in energy at a constant frequency, so that the turbine power plants do not have the control parameter for the operating reserve. In the present invention, the monitoring of the rotational speed-specific characteristic quantity for the rotational speed of the turbine serves as the regulation parameter for the turbine power plant, and this replaces the regulation to the general network frequency in the non-local power network. However, since these turbine power plants cannot respond as quickly as needed to parameter changes, the energy storage installation, which is controlled on the basis of the transmitted rotational speed of the turbine, serves as a quickly regulatable power reserve in order to bridge power peaks without the need to measure network parameters in the non-local power network. The characteristic quantity signal transmitted by the monitoring unit can comprise the rotational speed-specific characteristic quantity itself or else a control signal based on the rotational speed-specific characteristic quantity or on the evaluated rotational speed-specific characteristic quantity in order to release energy into or to absorb energy from the energy storage installation. If the characteristic quantity signal itself does not comprise the instructions to the energy storage installation to feed energy in or to release energy, then the energy storage installation itself has to derive a rise or a fall in the rotational speed of the turbine on the basis of the characteristic quantity signal. If the characteristic quantity signal consists, for example, only of the rotational speed-specific characteristic quantity, then in one embodiment, the energy storage installation is suited to calculate a rotational speed from the rotational speed-specific characteristic quantity in that an appropriate algorithm is executed, for instance, in the control unit of the energy storage installation. This rotational speed can be compared to a target rotational speed and consequently, a rise or a fall in the rotational speed of the turbine can be ascertained. As an alternative, the rotational speed-specific characteristic quantity can be compared to a target value that represents the target rotational speed. On the basis of the deviation of the rotational speed-specific characteristic quantity from a target value, the rise or fall in the rotational speed of the turbine is ascertained. The monitoring unit transmits the characteristic quantity signal to the control unit via a suitable data line. This data line can be implemented by means of data cables or wirelessly.

The energy storage installation according to the invention can be any suitable energy storage installation that, on the basis of its storage properties and storage parameters, is capable of providing a primary or a secondary operating reserve for non-local power networks. The present invention presupposes energy storage installations that permit a very fast release or a very fast absorption of a given amount of energy. Suitable energy storage installations are thus, for example, compressed air storage systems or hydrogen storage systems in combination with fuel cells, battery systems or kinetic energy storage systems such as, for example, flywheel energy storage systems.

The energy storage installation can be connected either directly to the non-local power network, or else indirectly to a non-local power network via a connected local power network like the connection to the turbine power plant. Therefore, the energy storage installation constitutes a local operating reserve for larger power consumers that might be additionally connected or for inrush current peaks and they constitute a storage reservoir for storing local surplus amounts of energy, without the energy storage installation having to be connected to a global external network control or to a network agency for purposes of network-supporting control. The operating reserve (also known as reserve power) additionally provided by the energy storage installation ensures that power customers are supplied with precisely the electric power they require in case of unforeseen events in the power network that are manifested in the form of a rise or a fall in the rotational speed of the turbines in the turbine power plant. For this purpose, short-term output adaptations in turbine power plants can be made that are due to a temporarily fluctuating energy demand, so that the starting time or output adaptation time for energy storage systems or for power plants that are starting up or ramping up can be bridged. In one embodiment, the energy storage installation is electrically connected to the turbine power plant in such a way that the energy storage installation additionally provides black start support for the turbine power plant. In general, the term "black start" refers to the start-up of an energy supplier after a power failure when this happens independently of the power grid. The expression "black start capability" refers to the capability of such an energy supplier—starting from the switched-off state—to start up or to release energy from an energy storage system, independently of the power grid. This is especially important in case of a widespread failure of the non-local power network that has occurred in spite of the presence of combined power plants, so that the non-local power network can be put back into operation. The energy of power plants or of energy storage installations having black start capability can then be used to start up power plants or energy storage installations that do not have black start capability. For example, thermal power plants require a large amount of electric energy before they themselves can produce electric or thermal power. If one or more local energy storage installations according to the invention that have black start capability are placed next to a coal-burning or nuclear power plant block within the scope of the energy storage system according to the invention that has a sufficient capacity, then black start capability can be achieved for the entire system here as well. Consequently, the combined power plant not only lowers the risk of a so-called blackout in non-local power networks that have a large number of wind power plants or solar power plants that feed in energy, but it also facilitates the renewed start-up of the turbine power plants after a network failure that may nevertheless have occurred.

The energy storage installation is controlled by the control unit on the basis of the characteristic quantity signal that arises from the time-related behavior of the rotational speed-specific characteristic quantity. The term "control unit" here refers to a component in the energy storage installation that controls the energy storage installation, that is to say, that sets the desired operating states and operating parameters and that controls the energy storage installation on the basis of an operating plan containing the desired operating states as a function of the characteristic quantity signal. For example, if the characteristic quantity signal consists only of the rotational speed-specific characteristic quantity, then, in one embodiment, the control unit can calculate a rotational speed from the rotational speed-specific characteristic quantity in that an algorithm that is suitable for this purpose is executed in the control unit.

In one embodiment, the control unit is also configured in such a way that—in response to an appertaining characteristic quantity signal—it causes the energy storage installation to absorb energy from the non-local power network or to absorb some of the energy provided by the turbine power plant for the non-local power network and to subsequently store this energy, if the rotational speed of the turbine is rising. Thus, at a low load, an energy supply that is possibly too high can be absorbed from the non-local power network within the scope of the capacity of the energy storage installation, and it can be fed back into the network during later phases of high energy demand in response to an appertaining characteristic quantity signal, and this is done either directly or indirectly via the connection of the turbine power plant to the non-local power network. In this manner, the operation of the energy storage installation according to the invention lowers the risk of a network failure, also if the energy supply in the network is too high. In one embodiment, energy is only additionally fed in if the rotational speed of the turbine falls below a first threshold value, and/or the absorption and storage of energy only takes place if the rotational speed of the turbine rises above a second threshold value. Therefore, the energy storage installation does not have to respond to every slight fluctuation of the rotational speed of the turbine, and this is gentle on components in the energy storage installation that might not be completely resistant to load change, thereby also increasing the trouble-free availability of the energy storage installation. It is precisely the fact that the available energy storage installation remains permanently available that makes it possible to efficiently increase the reliability against a sudden power failure (blackout) in the non-local power network.

In one embodiment, the control unit controls the amount of additionally fed-in energy and/or the amount of absorbed energy as a function of a deviation of the rotational speed of the turbine from a target rotational speed. Consequently, the combined power plant can respond to changing loads in the non-local power network especially quickly and on an as-needed basis.

In one embodiment, the energy storage installation has a modular structure so that, if necessary, additional energy storage modules can be added to or removed from the energy storage installation. It is precisely the modular structure that permits the energy storage installation to be continuously and flexibly adapted to the actual regulation requirements. Thanks to the modular design of the energy storage installation, the amount of energy that can be stored by the energy storage installation per unit of time can be adapted to the amount of energy that is made available by the turbine power plant, so that the energy capacity of the energy storage installation in turbine power plants of different sizes can always be of an appropriately adapted magnitude that is sufficient for the specific turbine power plant. On the one hand, the energy storage installation that has been adapted in this manner can provide an effective support operation of the non-local power network and it is particularly well-suited to bridge the start-up, ramp-up or ramp-down time of a given turbine power plant if a power adaptation becomes necessary. For this purpose, within a period of time of mere minutes, the energy storage installation simply has to be able to supply or absorb the amount of energy that this specific turbine power plant can normally supply. In order to be able to effectively perform these functions, the energy storage installation does not necessarily have to be in close physical proximity to the turbine power plant in question, but rather, merely has to be connected to it for purposes of transmitting the characteristic quantity signal.

In one embodiment, the energy storage modules of the energy storage installation are connected inside the energy storage installation to an internal power network of the energy storage installation, and the internal power network is connected via an appropriate regulation unit to the non-local power network or to the turbine power plant. The internal power network permits a simple integration of additional energy storage modules as needed, independently of the connections to the non-local power network and/or to the turbine power plant. In a preferred embodiment, each energy storage module has its own connection point to the internal power network for this purpose.

The regulation unit is configured to regulate an energy flow between the connected power networks (non-local power network and/or connection to the turbine power plant) and the energy storage installation. If the connected power networks were connected only to one connection point of the energy storage installation, then the energy fed in by the local energy storage installation would only be fed into the power network that has the greatest energy demand. However, with this approach, it would no longer be possible to achieve a systematic regulation based on a distribution of tasks. Modern energy storage systems are typically connected via a switch to one single power network. Here, the control of the energy flow would be eliminated and the switch would only be opened in case of a network failure. In the present invention, in contrast, the regulation unit is configured in such a way that, after the non-local power network has been disconnected, the turbine power plant can continue to be supplied with energy or else energy can still be absorbed from it. Thus, in case of a network failure, the turbine power plant is disconnected from the grid, but for a transition period, it can still provide the energy storage installation with energy until the latter is completely charged. Only after that would the turbine power plant have to be switched off. The fully charged energy storage installation could then also be available with its full capacity for black start support of the turbine power plant that might become necessary. The regulation unit controls the energy flow in the manner prescribed by the control of the energy storage installation. Moreover, in a preferred embodiment, the regulation unit is provided to disconnect one or more of the connected power networks from the local energy storage installation on an as-needed basis. If one of the connected power networks were to fail, then, under certain circumstances, the regulation unit disconnects this power network from the energy storage installation within just a few milliseconds, so that the energy storage installation remains operational for the other power networks. Otherwise, a short circuit or an overload situation might occur.

In one embodiment, in the case of several energy storage modules in the energy storage installation, each energy storage module comprises a module control unit that serves to control the release of energy into or the absorption of energy from the internal power network, and the control unit of the energy storage installation is configured as a master control unit for the module control units. In this process, the module control units regulate the operating parameters of the individual storage units in the energy storage modules, whereby the operating parameters that are to be set are either directly prescribed by the master control unit or else a specification of an amount of energy that is to be absorbed from or released to the appertaining energy storage module is converted by the module control units into operating parameters that are to be established appropriately for the individual storage units. By means of the communication that is established with the monitoring unit of the turbine power plant and that is executed by the master control module, the individual energy storage modules—with the same structure and without any technical adaptations—can be introduced into the internal power network of the energy storage installation as needed in order to expand the capacity, and after that, they are immediately ready for operation without any additional control measures. Here, an energy storage module can provide, for instance, a capacity of 1.6 MWh. For an energy storage installation having, for example, 20 energy storage modules of 1.6 MWh each, this translates into a total capacity of the energy storage installation of 32 MWh. The total capacity can be appropriately selected through the suitable choice of the number and size of the modules for the turbine power plant in question.

In another embodiment, the energy storage module is configured as a mechanical energy storage module with one or more flywheel energy storage units. Flywheel energy storage systems have the advantage that they can provide the consumers with the amounts of energy that are to be absorbed or released extremely variably and precisely, in addition to which they can store this energy in the form of mechanical energy. As a result, the energy storage installation can be very precisely regulated to the rotational speed of the turbine using the characteristic quantity signal, which ultimately leads to the greatest possible network stabilization and thus to the best possible blackout prevention. Furthermore, flywheel energy storage systems are resistant to load change and are thus very well suited (in contrast, for instance, to battery storage systems) to compensate for or to smooth even small load fluctuations by briefly feeding energy into or absorbing energy from the non-local power network. Moreover, flywheel energy storage systems pose a much smaller risk potential in case of fire than, for example, a larger array of batteries, which are interconnected to form a battery energy storage installation, or hydrogen storage systems that have hydrogen tanks containing flammable hydrogen as the risk potential. In compressed air storage systems, however, non-flammable gases can be used to store energy, although the compressed air tanks still entail an explosion risk potential due to the high pressure in the compressed air tanks. Consequently, flywheel energy storage systems as energy storage installations constitute an environmentally safer technology for providing energy in comparison to other storage technologies and they are well suited for any desired number of load cycles per unit of time.

In the realm of energy provision, the term "negative energy provision" is used when energy is absorbed from the power network and stored in the flywheel energy storage system in the form of mechanical rotational energy. Correspondingly, the term "positive energy provision" is used when the energy stored in the flywheel energy storage system in the form of mechanical rotational energy is fed into the power network by decelerating the flywheels (or rotors). Here, the capability of flywheel energy storage systems to provide energy within just a few milliseconds is just as advantageous as the capability to supply the specified power over a period of time of several minutes. The connection of the energy storage installation to the non-local power network and/or to the turbine power plant can be appropriately configured by the person skilled in the art.

In another embodiment, the control units of several energy storage installations of different combined power plants can also be connected via a communication network, if applicable, to a central control unit, in order to operate the plurality of energy storage installations as energy storage systems. In such a system consisting of several combined power plants or several energy storage installations of a combined power plant, the control of the individual energy storage installations on the basis of the characteristic quantity signals of the individual turbine power plants could be replaced by a global demand control performed by the central control unit, or else it could be augmented in case of free capacities available in the individual energy storage installation. In such an energy storage system, the control of the individual energy storage installation would not be effectuated in response to the characteristic quantity signals of the connected turbine power plant, but rather, the central control unit would control the characteristic quantity signals of all of the combined power plants involved and would accordingly transmit to the appertaining local control units the global control instructions that take the place of the characteristic quantity signals. In order to execute the global control instructions in the energy storage system, the energy storage installation does not even have to be directly connected to the non-local power network. For this purpose, it is sufficient for the energy storage installation to be connected indirectly via the turbine power plant to the non-local power network. The global control instructions transmitted by the central control unit to the various energy storage installations can take into account the tasks of the energy storage system in their entirety or else specifically for regional purposes. Thus, for example, on the basis of changed external influences on the energy storage system level, a need can arise to adapt the local power reserve or the storage of local surplus amounts of energy of one or more energy storage installations. The central control unit would accordingly create and transmit new global control instructions for these energy storage installations, and these global control instructions would then be carried out for the individual energy storage installations by the appertaining control units on site. For instance, due to an anticipated greater wind force, a larger amount of wind energy from a wind power plant has to be temporarily stored. The energy storage installations in question that are near the wind power plant do not have sufficient storage capacity free for this since the energy storage installations located there are already excessively charged. In this case, the central control unit effectuates an energy transfer to other energy storage installations that are not fully charged so that sufficient storage capacity can then be provided on site in order to store the anticipated amount of wind energy at the local energy storage installations on site.

For this purpose, the central control unit and the individual local control units have to be connected via a communication network. The communication network can be appropriately configured by the person skilled in the art within the scope of the present invention. For example, the communication network is a radio-based network or a cellular network, a high-availability connection or a network according to IECG. As an alternative, the communication network could also be configured as a hard-wired telephone network or via a computer network (for example, the Internet). In one embodiment, the communication network comprises several different types of networks (sub-communication networks) and corresponding interfaces to the central control unit and to the local energy storage system(s) and/or to the local control unit(s). The presence of several sub-communication networks in the communication network greatly reduces the failure risk of the entire communication network, since, if one type of network fails, alternative network types are available for unhindered communication between the central control unit and the local control units. Preferably, the communication network comprises cable, radio and hard-wired sub-communication networks.

In another embodiment, the control units of the individual energy storage installations are configured to periodically check an existing connection to the central control unit via the communication network. In a so-called digital handshake, the presence of the communication connection is checked. For this purpose, the control unit sends a data packet to the central control unit and, in response, receives a corresponding data packet transmitted back to it. The sent transmission and the received return transmission are logged by the appertaining control unit and stored, for example, on a server or in a database. As an alternative, the above-mentioned digital handshake can also be initiated by the central control units in question. In a preferred embodiment, the digital handshake is carried out via the communication network between the control units directly as well. In this manner, it is ascertained at all times whether communication is possible between the central control unit and the control units of the energy storage installations. Consequently, an interrupted communication cannot be misunderstood as a failure to update the global control instructions involving a corresponding continuation of the last global control instructions. In case of an interrupted communication, another global control instruction could be necessary without the possibility to inform the control units of this effect.

In another embodiment, the control unit of the energy storage installation is configured so that, in case of an interrupted connection to the central control unit, it can restore this connection via an alternative sub-communication network that is present in the communication network. Owing to the redundancy in the communication network, it is possible to implement a conceivably important updating of the regulation and system tasks via the alternative sub-communication network. Possible sub-communication networks are, for example, radio-based, cable-based or hard-wired communication networks such as, for example, the cellular network, the Internet, the normal telephone network or the power network, where a data connection is established via the power cables in the power grid.

In one embodiment, the combined power plant comprises a plurality of energy storage installations that are arranged in geographically different locations and that are connected to the non-local power network. The geographically different locations permit a distribution of the energy storage installations over larger areas or regions so that the energy that has been additionally fed into the non-local power network can be supplied to a major consumer that might be located in the vicinity. In contrast to this, the energy that is provided, for example, by a large pumped storage plant might have to be transported to the consumer over large distances in the non-local power network.

In this context, the control unit is provided to control the energy storage installation for the particular combined power plant on the basis of the transmitted characteristic quantity signal of the turbine power plant. For this purpose, the monitoring unit of the turbine power plant has a suitable measuring unit that serves to determine the rotational speed-specific characteristic quantity for the turbine.

In another embodiment, the monitoring unit comprises several measuring units that serve to determine the rotational speed-specific characteristic quantity of the turbine in order to achieve a redundancy during the determination of the rotational speed. Measuring units, for example, in the form of a rev counter, exist in various versions that are, for instance, mechanical or electric. Commonly employed measuring methods are, for example, inductive, optical, acoustic or gyrometric measuring methods. The person skilled in the art is able to select suitable measuring units for determining the rotational speed of the turbine.

In another embodiment, the monitoring unit of the turbine power plant is connected to the control unit of the energy storage installation via the data connection configured as a secure data line for purposes of securely transmitting the characteristic quantity signal to the control unit. In this manner, the operational reliability of the combined power plant against manipulation from the outside is enhanced. The physical distance between the turbine power plant and the energy storage installation can vary quite markedly. In one embodiment, the energy storage installation can be located on the grounds of the turbine power plant. Here, a secure data line is not absolutely necessary since the power plant grounds can also be safeguarded independently. In another embodiment, the energy storage installation can be located at a considerable distance away from the grounds of the turbine power plant. Here, a secure data transmission increases the operational reliability of the combined power plant as well as the reliability against network failures.

The invention also relates to a method for operating a combined power plant according to the invention, whereby the combined power plant comprises at least one turbine power plant for feeding power into a connected non-local power network and it also comprises at least one energy storage installation that is connected separately or via the turbine power plant to the non-local power network, comprising the following steps:

the rotational speed of the turbine is monitored on the basis of a rotational speed-specific characteristic quantity by means of at least one monitoring unit, at least while energy is being fed into the non-local power network by the turbine power plant;

a characteristic quantity signal based on the rotational speed-specific characteristic quantity is transmitted from the monitoring unit to a control unit of the energy storage installation via a data connection; and energy is fed into the non-local power network by means of the energy storage installation as initiated by the control unit in response to the characteristic quantity signal, if the rotational speed of the turbines is falling.

In one embodiment, the method comprises the additional step in which the energy storage installation absorbs and stores energy from the non-local power network or some of the energy provided by the turbine power plant for the non-local power network, as initiated by the control unit in response to a turbine rotational speed signal to this effect, if the rotational speed of the turbine is rising.

In another embodiment, the method comprises the additional step in which the control unit variably controls the amount of additionally fed-in energy and/or of the amount of absorbed energy as a function of a deviation of the rotational speed of the turbine from a target rotational speed.

BRIEF DESCRIPTION OF THE FIGURES

These and other aspects of the invention are shown in detail in the figures as follows.

DETAILED DESCRIPTION OF THE EMBODIMENTS

Figure 1:
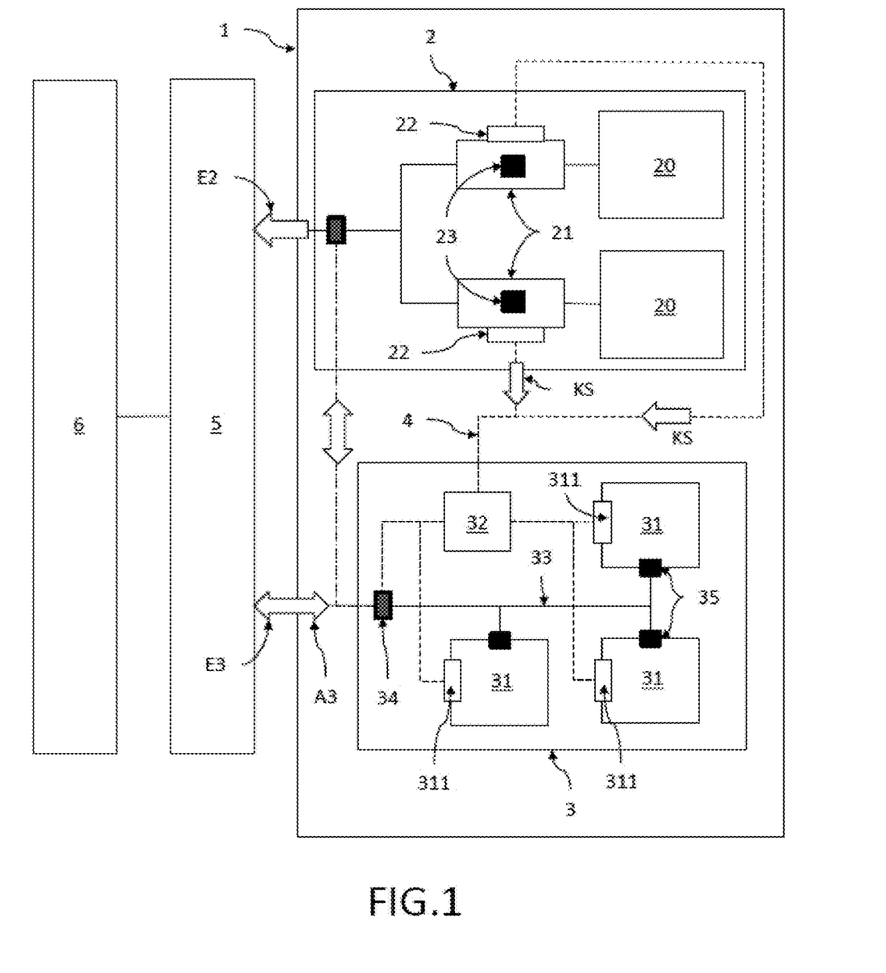
FIG. 1 an embodiment of the combined power plant according to the invention.

FIG. 1 shows a combined power plant 1 for feeding energy into a non-local power network 5 to which consumers (loads 6), which are not described in greater detail here, are connected. The combined power plant 1 here comprises a turbine power plant 2, for example, a coal-burning power plant, and an energy storage installation 3 with three energy storage modules 31 of the same type. The turbine power plant 2 comprises two power plant blocks 20, each with a turbine 21 for feeding E2 energy into the connected non-local power network 5. Each of the turbines 21 comprises a measuring unit 23 for measuring the rotational speed-specific characteristic quantity, for example, the rotational speeds of the appertaining turbine 21, at least while energy is being fed E2 into the non-local power network 5, and also comprising a monitoring unit 22 connected to the measuring units for purposes of monitoring the rotational speed of the turbine on the basis of the rotational speed-specific characteristic quantity KD. Here, on the one hand, the energy storage installation 3 is connected separately to the non-local power network 5 and additionally to the connection point of the power plant turbines 21 of the turbine power plant 2 (dot-dash line with a double arrow). In other embodiments, there can also be several measuring units 23 per turbine 21 or several monitoring units 22 per turbine 21. In another embodiment, there can be just one shared monitoring unit 22 for all of the turbines 21 per turbine power plant 2, equipped with at least one measuring unit 23 per turbine 21, in order to calculate an average rotational speed of the turbine on the basis of the rotational speed-specific characteristic quantity KD and in order to send an appertaining characteristic quantity signal KS to the control unit 32. The two monitoring units 22 are connected to the control unit 32 of the energy storage installation 3 in order to transmit a characteristic quantity signal KS to the control unit 32 via a data line 4 (broken lines). Here, the control unit 32 of the energy storage installation 3 is configured in such a way that—in response to the characteristic quantity signal KS—it causes the energy storage installation 3 to feed E3 additional energy into the non-local power network 5, if the rotational speed of the turbines 21 is falling (for example, below a first threshold value), or to absorb and store A3 energy from the non-local power network 5 or some of the energy provided by the turbine power plant 2 for the non-local power network 5, if the rotational speed of the turbine 21 is rising (for instance, above a second threshold value). The first and second threshold values can be below or above a target value for the rotational speed of the turbine. The person skilled in the art can suitably select the differences between the target value of the rotational speed of the turbine or the rotational speed-specific characteristic quantity KD and the first and second threshold values. In the case of continuous control, the control of the release of energy into or the absorption of energy from the energy storage installation can take place at the time of any deviation from the target value SD or of the rotational speed of the turbine or of the rotational speed-specific characteristic quantity KD. The energy storage installation 3 shown here comprises three energy storage modules 31 that are connected within the energy storage installation 3 to an internal power network 33, whereby the internal power network 33 is connected via an appropriate regulation unit 34 to the non-local power network 5 and to the turbine power plant 2. Each energy storage module 31 is connected via its own connection point 35 to the internal power network 33 of the energy storage installation 3. Each energy storage module 31 comprises a module control unit 311 that serves to control the energy storage module, whereby the control unit 32 of the energy storage installation 2 is configured as a master control unit 32 for the module control units 311. The embodiment of the turbine power plant 2 with two power plant blocks 21 is only shown here by way of example and can vary for other power plants 2 in terms of number and output. By the same token, the energy storage installation can comprise fewer than three energy storage modules or else more energy storage modules.

Figure 2:
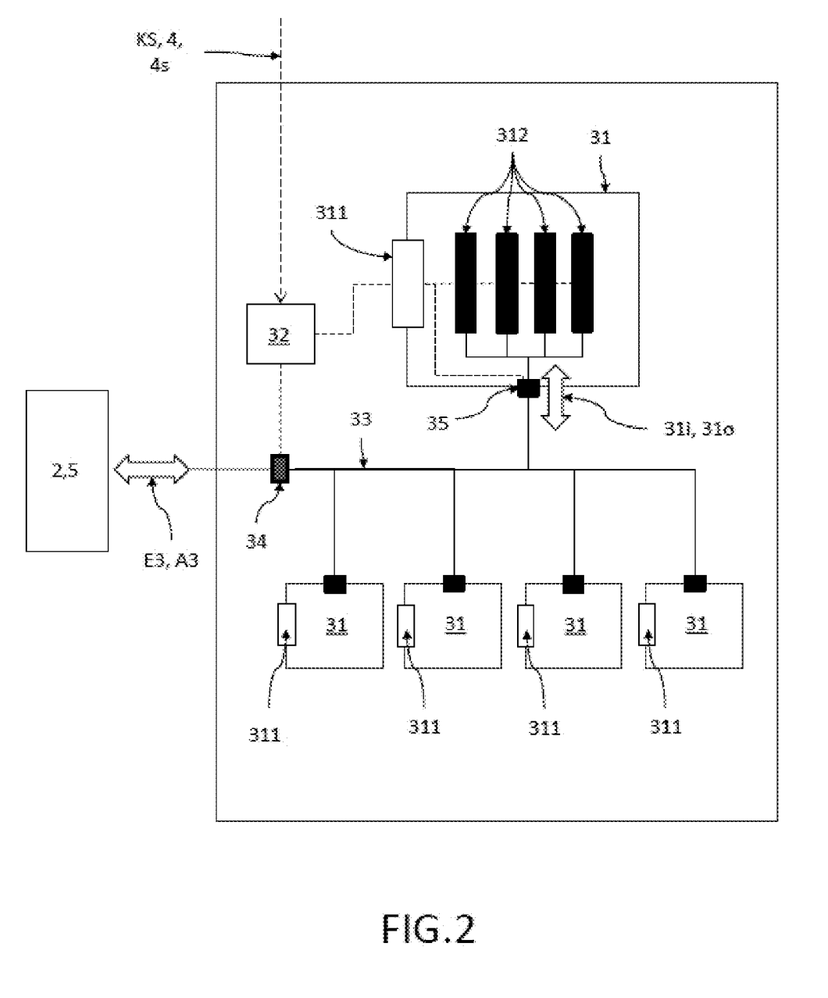
FIG. 2 an embodiment of an energy storage installation in the combined power plant according to the invention.

FIG. 2 shows another embodiment of an energy storage installation 3 in the combined power plant 1 according to the invention, whereby, as an example, one of the energy storage modules 31 is configured as a mechanical energy storage module 31 with four flywheel energy storage units 312. In other embodiments, there can be a different number of flywheel energy storage units 312 per energy storage module 31. This number can also vary between different energy storage modules 31. Here, the module control unit 311 regulates the release 31o of energy into or the absorption 31i of energy from the internal power network 33 in response to the instructions given by the control unit 32 of the energy storage installation 3 as the master control unit 32.

Figure 3:
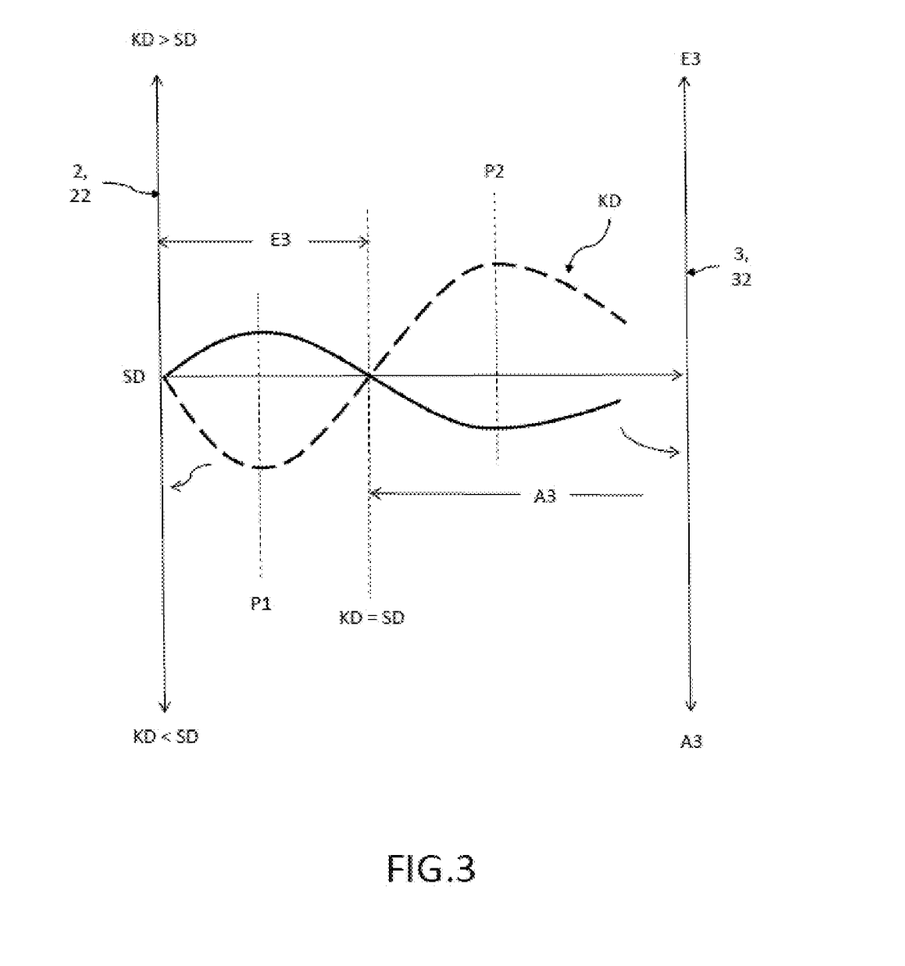
FIG. 3 an embodiment of the control of the energy storage installation on the basis of the rotational speed of the turbine based on the rotational speed-specific characteristic quantity.

FIG. 3 shows an embodiment for controlling the energy storage installation 3 on the basis of the rotational speed-specific characteristic quantity KD (for example, a measured rotational speed) of the turbine. The sinusoidal broken line KD represents an example of a curve of the rotational speed-specific characteristic quantity KD over time. The curve shape has been chosen merely for illustrative purposes and, during operation, can deviate in many ways from the curve shown here. The left-hand vertical axis shows the rotational speed-specific characteristic quantity KD with a target rotational speed SD as a horizontal line. The rotational speed-specific characteristic quantity KD above the target rotational speed SD corresponds to turbine rotational speeds that are greater than the target value SD. Correspondingly, the rotational speed-specific characteristic quantities KD below the target value SD correspond to rotational speeds that are smaller than the target rotational speed of the turbine. The right-hand vertical axis indicates the fed-in energy (above the horizontal axis) or the absorbed energy (below the horizontal axis) for the energy storage installation 3. The vertical broken lines especially designate points in the curve of the rotational speed-specific characteristic quantity KD over time. For the points P1 and P2, the rotational speed-specific characteristic quantity KD is minimal or maximal respectively (corresponds to minimum and maximum rotational speeds of the turbine) during the recorded time interval. If the rotational speed-specific characteristic quantity drops below the target value SD, then, in this embodiment, energy is released into the connected power network, whereby the amount of energy released per unit of time (solid line) is increased until the decrease in the rotational speed-specific characteristic quantity KD has stopped. This increase can only take place as long as the indicated energy level lies below the maximum power output of the energy storage installation 3. Once the maximum power output has been reached, then it would be fed into the power network 5 constantly over time. In other embodiments, the feeding in can also be stopped as soon as the energy storage installation 3 drops below a certain storage level (for example, 10% of the maximum capacity). Parallel to the feeding in carried out by the energy storage installation, the turbine power plant can be ramped up if the rotational speed of the turbine has been below the target value for a prolonged period of time, so that the power plant itself can compensate for the deficit in the energy supply at a later point in time. Once the rotational speed-specific characteristic quantity KD is no longer decreasing, energy is fed into the power network 5 with a constant or with a decreasing (as shown here) amount of energy. If the rotational speed-specific characteristic quantity KD reaches the target value SD, then ideally, the release E3 of energy by the energy storage installation 3 is stopped. However, if the rotational speed-specific characteristic quantity KD continues to increase, then energy is absorbed from the energy storage installation 3 and stored A3. The stored amount likewise increases here until the rotational speed-specific characteristic quantity KD is no longer increasing. After that, the further absorption A3 is constant or drops again (as shown here) until (no longer shown here) the rotational speed-specific characteristic quantity KD once again reaches the target value SD.

Figure 4:
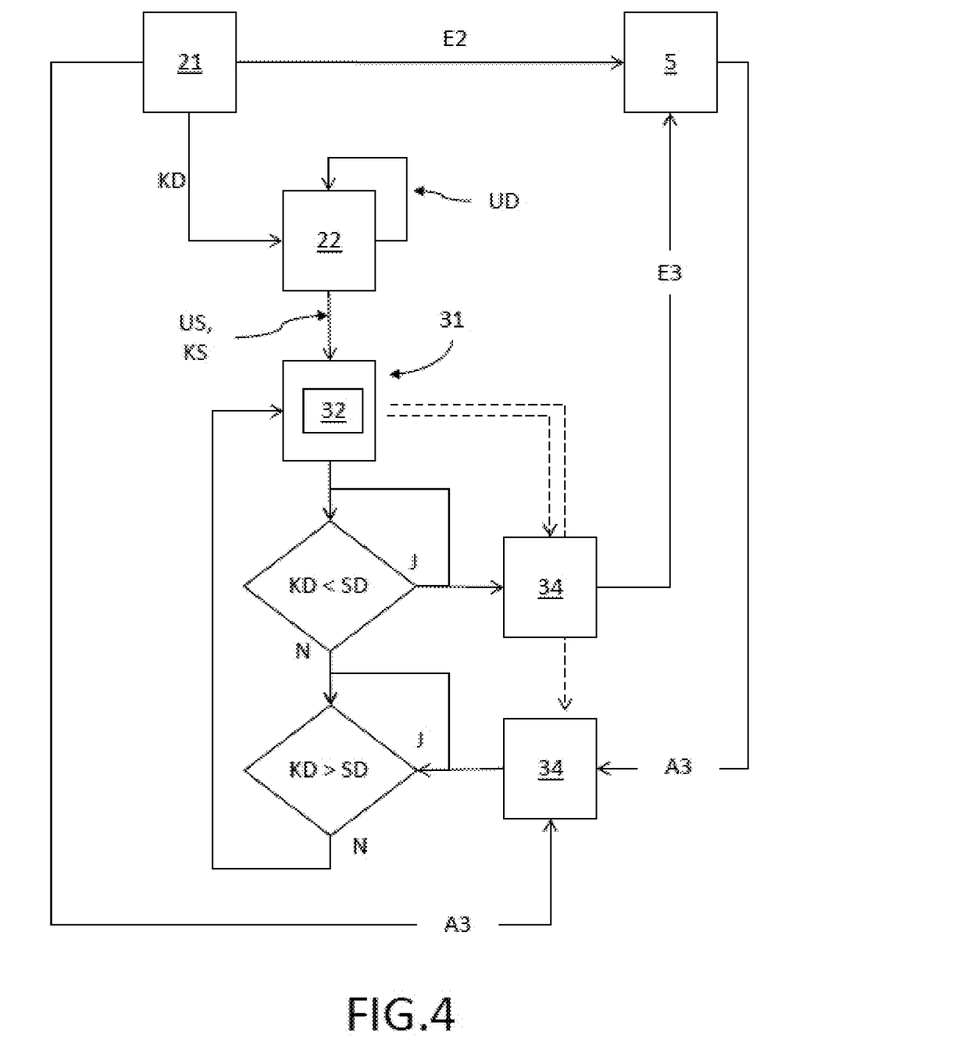
FIG. 4 an embodiment of the method according to the invention.

FIG. 4 shows an embodiment of the regulation method according to the invention, whereby the rotational speed of the turbine 21 is monitored DU on the basis of a rotational speed-specific characteristic quantity KD by means of at least one monitoring unit 22 at least while energy is being fed E2 into the non-local power network 5 by the turbine power plant 2. The monitoring DU is carried out continuously or periodically. For this purpose, the rotational speed-specific characteristic quantity KD is correspondingly supplied continuously or periodically by the turbine 21 or by the measuring points (not shown here) of the monitoring unit 22 that are suitable for this purpose. The characteristic quantity signal KS based on this monitoring DU is transmitted US by the monitoring unit 22 to the control unit 32 of the energy storage installation 3 via a data connection 4. Now, the control unit regulates the feeding E3 of energy into the non-local power network 5 via the regulation unit 34 in response to the characteristic quantity signal KS, if the rotational speed-specific characteristic quantity KD of the turbines 21 is decreasing (smaller than the appertaining target value SD). The energy can be fed in, for example, as shown in FIG. 3, until the rotational speed of the turbine has reached the target rotational speed (target value). If this is not the case, then it is checked whether the rotational speed-specific characteristic quantity KD for the turbine is above the target value SD (target rotational speed) (=has risen). If this is the case, the control unit 32 regulates the absorption and storage A3 of energy from the non-local power network 5 or some of the energy provided by the turbine power plant 2 for the non-local power network 5, as long as the rotational speed-specific characteristic quantity KD of the turbine 21 is above the target value SD and thus the rotational speed of the turbine has not reached the target rotational speed SD. For the feeding in E3 or absorption A3 of energy, the control unit 32 controls the regulation unit 34 of the energy storage installation 21 accordingly (shown here as broken-line arrows).

Figure 5:
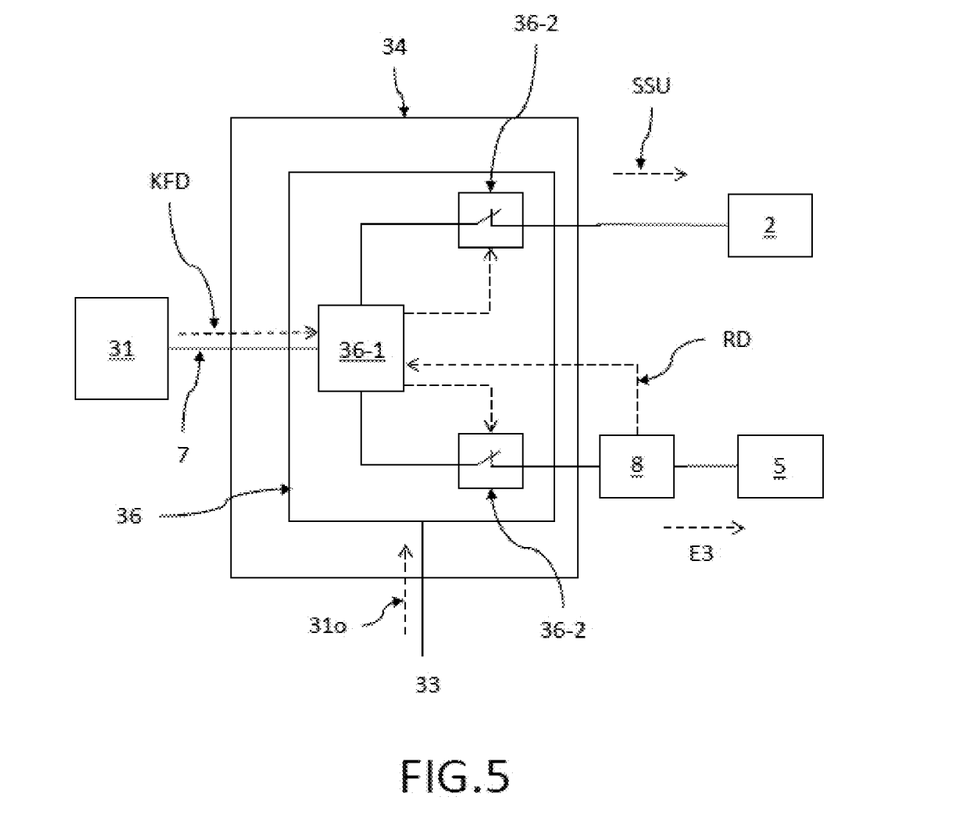
FIG. 5 an embodiment of the regulation unit of the energy storage installation.

FIG. 5 shows an embodiment of the regulation unit 34 that, in this embodiment, is connected to the turbine power plant 2 and to a non-local power network 5. So that the regulation unit 34 can regulate the energy flow between the energy storage installation 3 and the connected non-local power network 5 and/or the connected turbine power plant 2 and, if necessary, so that the regulation unit 34 can disconnect one or more connections from the local energy storage installation 3, the regulation unit 34 in this embodiment comprises a control box 36 with a controlling element 36-1 and separate disconnecting switches 37-2 for each of the connections to the non-local power networks 5 or to the turbine power plant 2. The control unit 32 (configured as a master control unit 32 if there are several energy storage modules) is connected via a data connection 7 to the controlling element 36-1 of the control box 36 and, in order to control the energy flows, it transmits applicable configuration data of the regulator function KFD to the control box 36, here directly to the controlling element 36-1. Based on the configuration data of the regulator function KFD, the controlling element 36-1 controls the distribution of the incoming/outgoing energy flow EF from/to the internal power network 33 to the disconnecting switches 36-2. In this embodiment, merely by way of example, the distribution of the energy flow with a direct feeding E3 of energy into the connected power network 5 is shown. The control box 36 is equally well-suited to control an energy flow from the connected power networks 5 and/or from the turbine power plant 2, whereby the magnitude of the two energy flows can be varied. The energy storage installation 3 is not shown here explicitly. Moreover, the control box 36 can simultaneously receive the relevant data RD from the appertaining measuring units 8 from the connected non-local power networks 5, and on this basis, the controlling element 36-1 derives the presence of the connected power network 5 by means of criteria or threshold values for the relevant data RD that are stored in the controlling element 36-1. If the connected power network 5 is no longer available due to a network failure, then the failure of the power network 5 manifests itself in the appertaining relevant data RD that has been transmitted to the controlling element 36-1, in response to which the controlling element 36-1 automatically sends out appropriate disconnection instructions (broken-line arrow) to the appertaining disconnecting switches 36-2 to disconnect the energy storage installation 3 from the connected power networks 5, after which the disconnecting switch 36-2 disconnects the previously connected power networks 5. The disconnection of the connected power network takes place within just a few milliseconds. After the disconnection from the power network, the energy storage system 1 remains ready for operation for the turbine power plant 2. Consequently, in case of a failure of the non-local power network 5, a short circuit or an overload situation can be effectively prevented. In other embodiments, the regulation unit 34, especially the control box 36, can also be connected to more than two power networks. The two or more connected power networks can also be local power networks, among other things. As a rule, even after the energy storage installation 3 has been disconnected from the non-local power network 5, it still has a considerable amount of energy stored that can also be transmitted to the turbine power plant, separately from the non-local power network. Thus, the energy storage installation, with the energy stored in it, is also available for black start support SSU of the turbine power plant after a network failure of the non-local power network.

The embodiments presented here merely constitute examples of the present invention and thus must not be construed in a limiting fashion. Alternative embodiments taken into consideration by the person skilled in the art are likewise encompassed by the scope of protection of the present invention.

LIST OF REFERENCE NUMERALS 1 combined power plant according to the invention
2 turbine power plant
20 power plant block in the turbine power plant
21 turbine of the turbine power plant
22 monitoring unit
22a, 22b several monitoring units for a turbine
23 measuring unit
3 energy storage installation
31 energy storage module
311 module control unit
312 flywheel energy storage units
31i absorption of energy from the internal power network by the energy storage module
31o feeding of energy into the internal power network by the energy storage module
32 control unit
33 internal power network of the energy storage installation 34 regulation unit for the connection of the energy storage installation to the non-local power network and/or to the turbine power plant
35 connection point
36 control box as part of the regulation unit
36-1 controlling element
36-2 disconnecting switch
4 data connection
4s secure data line
5 non-local power network
6 load (consumer) on the non-local power network
7 data connection between the regulation unit and the control unit
8 measuring unit for determining network data in the non-local power network
A3 absorption and storage of energy by the energy storage installation; amount of absorbed energy
E2 feeding energy from the regulatable power plant into the non-local power network
E3 feeding energy from the energy storage installation into the non-local power network, amount of fed-in energy
KFD configuration data of the regulator function
P1, P2 extreme values in the curve of the rotational speed of the turbine as a function of time
SD target value (target rotational speed) for the rotational speed-specific characteristic quantity
SSU black start support
KD rotational speed-specific characteristic quantity for the rotational speed of the turbine
KS characteristic quantity signal
UD monitoring of the rotational speed of the turbine on the basis of the rotational speed-specific characteristic quantity
US transmission of the characteristic quantity signal to the control unit

The invention claimed is:

1. A combined power plant for feeding energy into a non-local power network, comprising:
   at least one turbine power plant comprising a turbine and a connection to the non-local power network to feed energy in from the turbine power plant to the non-local power network;
   at least one energy storage installation comprising one or more energy storage modules; and
   a monitoring unit configured to monitor a rotational speed of the turbine, without any need to measure network parameters in the non-local power network, on the basis of a rotational speed-specific characteristic quantity without having to use the control parameters of a network frequency for this purpose, at least while the energy is being fed into the non-local power network,
   wherein the energy storage installation is connected to the non-local power network separately or via the turbine power plant, and
   wherein the monitoring unit is connected to a control unit of the appertaining energy storage installation in order to transmit a characteristic quantity signal based on the rotational speed-specific characteristic quantity to the control unit via a data connection, and the control unit of the energy storage installation is configured in such a way that, in response to the characteristic quantity signal, the control unit causes the energy storage installation to feed additional energy into the non-local power network, thereby improving safety against a sudden power failure in the non-local network, based on the rotational speed of the turbines falling, without the energy storage installation having to be connected to a global external network control or to a network agency for the purpose of network-supporting control.

2. The combined power plant of claim 1, wherein the control unit is also configured in such a way that, in response to an appertaining characteristic quantity signal, the control unit causes the energy storage installation to absorb energy from the non-local power network or to absorb some of the energy provided by the turbine power plant for the non-local power network and to subsequently store the absorbed energy, based on the rotational speed of the turbine rising.

3. The combined power plant of claim 2, wherein energy is only additionally fed in under the condition that the rotational speed of the turbine falls below a first threshold value, and/or the absorption and storage of energy only takes place under the condition that the rotational speed of the turbine rises above a second threshold value.

4. The combined power plant of claim 2, wherein the control unit controls the amount of additionally fed-in energy and/or the amount of absorbed energy as a function of a deviation of the rotational speed of the turbine from a target rotational speed.

5. The combined power plant of claim 1, wherein the turbine power plant comprises several turbines and further comprises at least one monitoring unit per turbine that serves to monitor the rotational speed of the respective turbine.

6. The combined power plant of claim 5, having several monitoring units per turbine to achieve a redundancy during the monitoring of the rotational speed.

7. The combined power plant of claim 1, wherein the monitoring unit comprises several measuring units that serve to determine the rotational speed-specific characteristic quantity to achieve a redundancy during the determination of the rotational speed-specific characteristic quantity.

8. The combined power plant of claim 1, wherein the energy storage installation has a modular structure permitting additional energy storage modules to be added to the energy storage installation.

9. The combined power plant of claim 8, wherein the energy storage modules of the energy storage installation are connected inside the energy storage installation to an internal power network of the energy storage installation, and the internal power network is connected via a regulation unit to the non-local power network or to the turbine power plant.

10. The combined power plant of claim 9, wherein each energy storage module has its own connection point to the internal power network of the energy storage installation.

11. The combined power plant of claim 9, wherein the energy storage installation comprises several energy storage modules, each energy storage module comprising a module control unit that serves to control the release of energy into or the absorption of energy from the internal power network, and the control unit of the energy storage installation is configured as a master control unit for the module control units.

12. The combined power plant of claim 1, wherein the energy storage module is configured as a mechanical energy storage module with one or more flywheel energy storage units.

13. The combined power plant of claim 1, wherein the monitoring unit of the turbine power plant is connected to the control unit of the energy storage installation via the data connection configured as a secure data line for purposes of securely transmitting the characteristic quantity signal to the control unit.

14. A method for operating a combined power plant according to claim 1, whereby the combined power plant comprises at least one turbine power plant for feeding energy into a connected non-local power network and also comprises at least one energy storage installation that is connected separately or via the turbine power plant to the non-local power network, the method comprising:

monitoring the rotational speed of the turbine on the basis of a rotational speed-specific characteristic quantity by means of at least one monitoring unit without any need to measure network parameters in the non-local power network and without having to use the control parameters of a network frequency for this purpose, at least while energy is being fed into the non-local power network by the turbine power plant;

transmitting a characteristic quantity signal based on the rotational speed-specific characteristic quantity from the monitoring unit to a control unit of the energy storage installation via a data connection; and     feeding energy into the non-local power network for the purpose of improving safety against a sudden power failure in the non-local network by means of the energy storage installation as initiated by the control unit in response to the characteristic quantity signal, based on the rotational speed of the turbines falling, without the energy storage installation having to be connected to a global external network control or to a network agency for the purpose of network-supporting control.

15. The method according to claim 14, further comprising:

the energy storage installation absorbing and storing energy from the non-local power network or some of the energy provided by the turbine power plant for the non-local power network, as initiated by the control unit in response to characteristic quantity signal to this effect, based on the rotational speed of the turbine rising.

16. The method according to claim 14, further comprising:

the control unit variably controlling the amount of additionally fed-in energy and/or of the amount of absorbed energy as a function of a deviation of the rotational speed of the turbine from a target rotational speed.

* * * * *